Patented Nov. 28, 1950

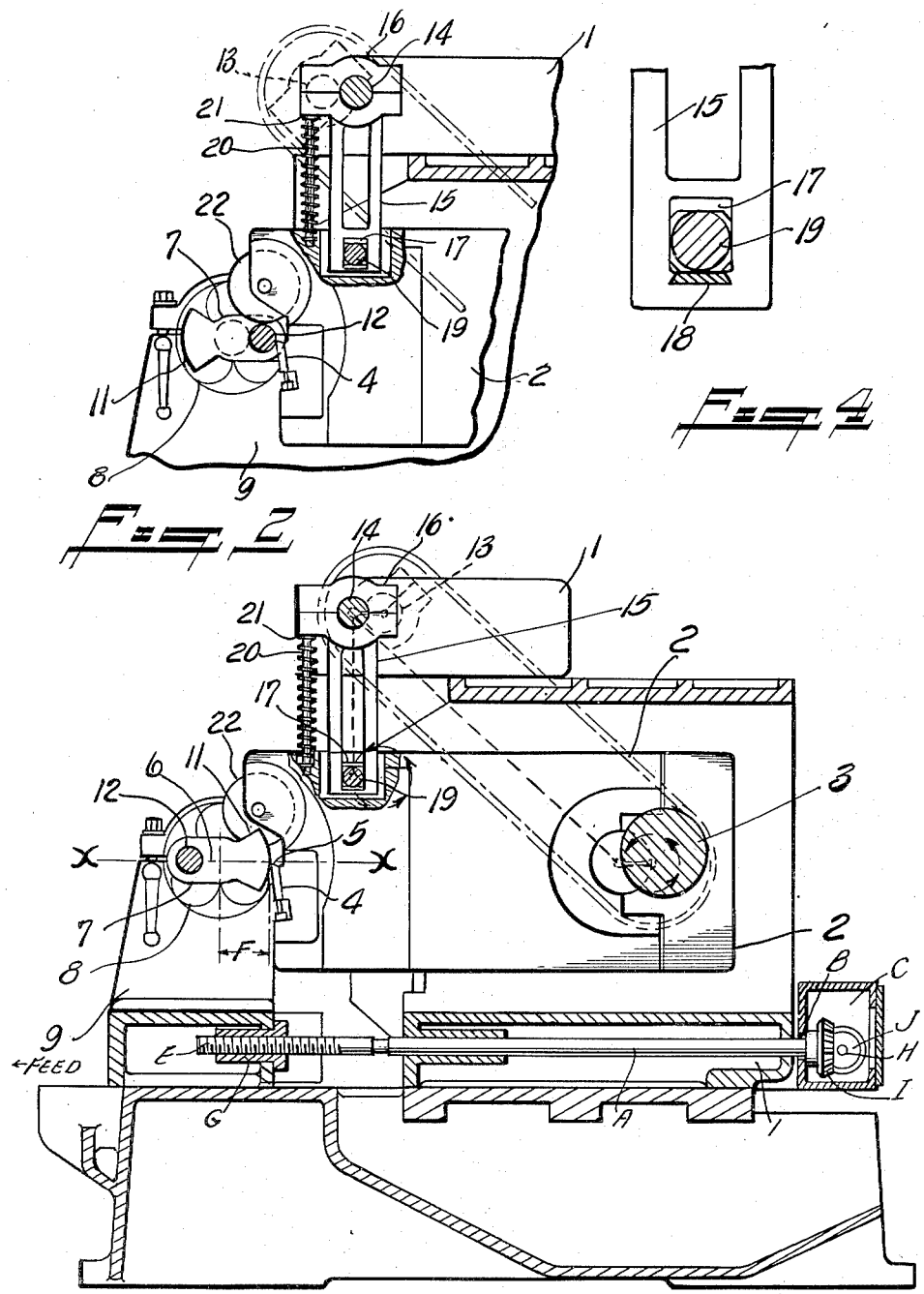

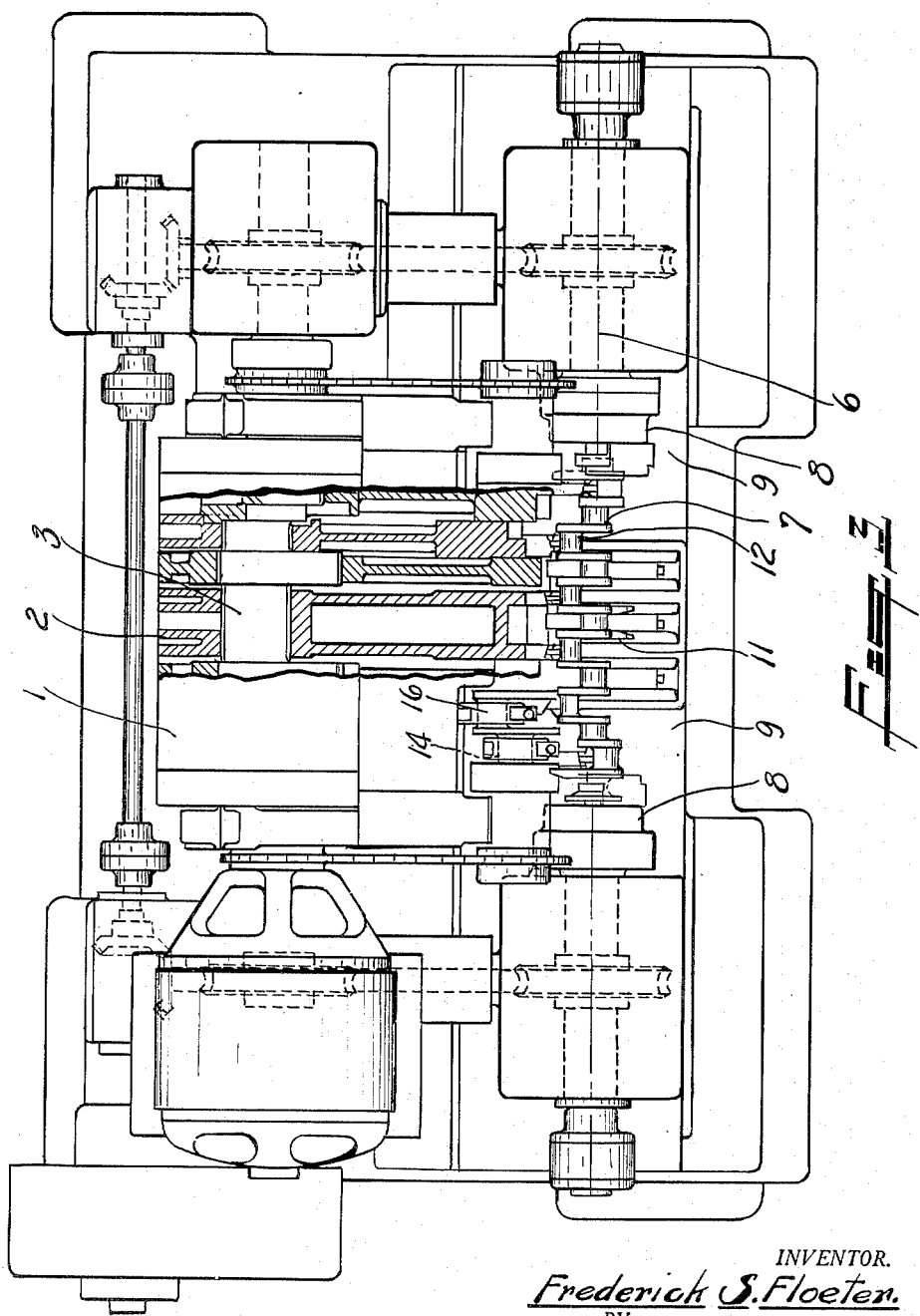

2,531,616

UNITED STATES PATENT OFFICE 2,531,616

MULTIPLE CRANKPIN TURNING LATHE

Frederick S. Floeter, Saginaw, Mich., assignor to Wickes Bros., Saginaw, Mich.

Application April 30, 1945, Serial No. 591,216

5 Claims. (Cl. 82—9)

This invention relates to machining crankshafts and the like in lathes having tool carriers that move in orbital paths, their movements being timed with the rotation of the work piece. Cutting tools are located on the front end portions of the tool carriers with their cutting edges directed toward the axis of the work. Means is usually provided for feeding the axis of the work sidewise toward the tool during the relative rotation of tool and work. Lathes of this type are commonly used to turn pins for crankshafts having several cranks, and also to machine or face off the cheeks of the crankshaft webs.

In this specification, my invention will be described as exemplified in a lathe equipped to face the cheeks and also to turn the crank pins, both in one cycle of lathe operations.

In lathes of the type here considered, the weight of the front end of the tool carrier has usually rested upon the revolving crank pin during the whole of the forward feeding movement of the crankshaft toward the tool, while facing off the cheeks of the crank.

It has been proposed to provide a wear-resisting shoe fixed to the tool carrier, in advance of the pin-turning portion. But that expedient was not satisfactory in practice, because the surface of the crank, as delivered from the forming dies, was always rough, uneven, and presented a bad bearing surface. The shoe pressed down rather heavily upon the rough pin surface, creating friction. Moreover, the tool carrier, because of such high-and-low contours on the pin, failed to keep the tool precisely in its best cutting position, which is with its cutting edge in a radial plane that includes the axis of rotation of the work, as will be hereinafter more fully explained in the description of my improvement. In fact, an obstruction, such as a die-flash or ridge on when the crank pin revolved to a point where an obstruction, such as a die-flash or ridge on the pin came up under the shoe and lifted it, the tool carrier also lifted up slightly and caused the cutting tool to deviate from its proper cut in the work. That gave unsatisfactory machining results.

This objectionable feature I have eliminated by keeping the cutting edge stable enough to get a degree of cutting accuracy and tool stability that meets the needs of present-day crankshaft production.

My improvement provides a support for the work piece such that the latter shall be fed axially sidewise in a horizontal plane toward the tool. It also provides a support for the front end of the orbital tool-carrier such that deviating tool motions, which persisted in the earlier shoe type, cannot occur. That is to say, the cutting edge will be consistently kept in the said plane, (within a very small margin of tolerance) throughout the entire machining operation on the faces of the crank cheeks.

The general objects of my invention are:

To provide a novel and improved device to support the weight of the orbital tool carrier independently of the crank pins;

To provide a tool carrier with an orbital mounting capable of keeping the cutting edge so accurately placed in relation to the radial plane, alluded to above, that the tool shall be kept almost perfectly steady while the web is being faced.

To provide a bearing block assembly for absorbing shocks and stresses such as are created by the tools when they start cutting periodically into the crank webs, to face off the cheeks; and also to take up the shocks caused by the abrupt snap-back when the tool abruptly leaves the cheek at the end of a facing cut;

To provide means by which tool stresses are delivered directly to the lathe housing where they are absorbed;

A more specific object is to provide a novel bearing block arrangement for carrying the entire weight of the front portion of the orbital tool carrier and also for receiving tool thrust stresses;

To provide a bearing block suspension device adapted to impart to the block the same orbital movement or path of travel as is imparted to the back end of the carrier by the master crank of the lathe;

To provide a carrier mounting and a work piece mounting arranged in relation to each other so as to permit convenient adjustment of the cutting tools while the work piece is in the machine and also enabling the work piece to be loaded, chucked, and unloaded more readily than was possible in earlier type multiple crankshaft lathes;

With the foregoing and certain other objects in view which will appear later in the specification, my invention comprises the devices described and claimed and illustrated in the accompanying drawings, and equivalents thereof.

In the drawings a preferred embodiment of my invention is shown as it appears in a lathe designed to face the cheeks and turn the crank pins in a single cycle of tool operations.

In the drawings:

Fig. 1 is a transverse vertical section of a lathe embodying my invention and showing the relative arrangement of the work piece and the tool carrier in position for facing the cheeks of the crank webs.

Fig. 2 is a similar fragmentary view showing the tool and work piece in position for turning the crank pin.

Fig. 3 is a top plan view of the parts shown in Fig. 2, part of the housing being broken away to show in horizontal section the arrangement of the tool carriers and work piece.

Fig. 4 is an enlarged detail view of the bearing block and gudgeon pin arrangement for supporting the front end of the tool carrier.

Referring now more specifically to the drawings, the numeral 1 designates the housing of a crankshaft lathe embodying my invention with a tool carrier 2 mounted therein for orbital movement on a master crank 3 in the customary manner. At the front end of the carrier 2 is mounted a tool 4 whose cutting edge 5 is directed toward the axis 6 of the work piece 7, which in this instant case is a six-throw crankshaft.

Cutting edge 5 is kept, by means of my invention, in a plane X—X whose position is defined by being radial and median with respect to the cheek 11 and also including the axis.

The crankshaft work piece is mounted in centered position in chucks 8, 8 and is gripped in the conventional manner. The chucks and their driving mechanism are mounted for transverse feeding movement (see line F on Fig. 1), toward and away from the tool 4, on carriages 9, 9, which are slidable on ways (not shown).

The means for rotating the work is omitted in the interest of clarity, it being understood that all moving parts are coordinated and operate together in correctly timed relation, as is common lathes of this general character.

The means for feeding the carriage 9 comprises a pair of transversely disposed shafts A journaled in conventional bearings B provided in the gear housing C mounted on the rear of the frame, and inasmuch as both shaft assemblies are identical, I shall describe but one assembly only.

One end of the shaft A is threaded as at E and has threaded engagement with a nut G mounted in the carriage 9, and a chip guard (not shown) is provided to shield and divert chips (not shown) from the shaft. The opposite end of the shaft is journaled in the bearing B and extends into the housing C, a beveled gear I being mounted on said shaft within said housing, said gear meshing with and being driven from a similar gear J which is mounted on the longitudinally disposed shaft H within the housing C, which shaft is driven from a hydraulic motor (not shown), and it will be obvious that as the shaft H is driven, the carriage 9 will be actuated as indicated at line F on Fig. 1 of the drawing.

Referring now to Fig. 1, which shows the cutting edge 5 of tool 4 located in the plane X—X and the work piece 7 in position for the tool to commence facing off the cheeks 11 of the crank webs; the feeding movement of the work 7 will be along the line F and takes place from the position shown in Fig. 1, proceeding toward the right. Axis 6 will move sidewise toward the cutting edge 5 of the tool along the line F.

So long as cutting edge 5 remains exactly in the radial plane X—X there can be no deviating motions of tool 4 with respect to the work being machined. The cut will always be steady and even. But if edge 5 is shifted, even slightly while it is cutting, unsatisfactory machining will result.

It has already been explained how, in certain earlier devices, the tool was actually caused to move slightly in an up-and-down direction while cutting the metal in a cheeking operation. It has been pointed out how such undesirable tool movements were caused, namely, by the front end of the tool carrier being compelled to ride on the unfinished crank pin 12 of the work piece 7. Roughnesses on the surface of the pin not only caused the tool carrier, and consequently the tool, to have variant movements that caused unsatisfactory cutting action of the tool edge 5, but sometimes caused chattering.

I shall now explain how I have overcome such difficulties by a novel and simple but effective device whereby the weight of the orbital tool carrier 2 is supported independently of the crank pins 12 during the facing off of the web cheeks 11.

While the work piece 7 is rotating on its axis 6, it is necessary that tool carrier 2, supported for orbital movement on the master crank 3, shall have identical orbital parallel motion movements at its front end, where tool 4 is mounted, and at its rear end on master crankshaft 3. To support the left-hand end of the tool carrier for such correct orbital movement without depending at all on crank pin 12 to serve as a second master crank, I have devised the following mechanism whereby the stated objects of my invention are attained.

Numeral 13 designates a main drive shaft with cranks and crank pins 14. On each crank pin is a suspension member 15 similar to a downwardly extending connecting rod. It has a journal bearing 16 at the top in which the crank pin 14 is mounted, and at the bottom of the suspension member 15 is a seat 17 in which is mounted a hardened steel bearing block 18, shown in enlarged detail in Fig. 4.

Bearing block 18 presents a seat for a gudgeon pin 19 which is fixed horizontally to the tool carrier 2. Thus, the weight of the forward end of the orbital tool carrier 2 is sustained by the gudgeon pin 19 and the pin is supported by bearing block 18, its suspension connecting rod 15 with bearing 16 on crank pin 14, and so by the main crankshaft 13 and housing 1. Crank pin 14 has the same orbital movement as the gudgeon pin 19 and tool carrier 2, consequently, all three move together.

The gudgeon pin 19 is kept in contact with bearing block 18 by the weight of the tool carrier. Hence, at all times during the cutting operation on the crank cheek, the cutting edge 5 of the tool cannot deviate from its true circular, orbital path. No unevenness of the crank pin surface, or any other such factor in the work piece can change the proper position of the tool 4 for best cutting action.

In facing the cheeks, engagement of the work piece against edge 5 of tool 4 is intermittent. When the work piece first contacts the tool, it is evident that the tool stresses are delivered directly to the housing 1 by a short route i. e. through tool carrier 2, the bearing block 18, its seat 17, the suspension member, crank pin 14, and thence through shaft 13 to the rigid lathe housing 1.

When the tool 4 has cut across the width of the cheek 11, there is a sudden snap-back when the tool and cheek separate, and that jar is damped by a compression spring 20 interposed between tool carrier 2 and a projection 21 of bearing 16. The spring tends to perpetually keep the gudgeon 19 down in bearing contact with bearing block 18 under all conditions of use. So long as these members 18 and 19 are kept in contact, there can be no aberrational movement at the cutting edge 5 of the tool 4.

To make evident the orbital motion features involved in the above described operation of the tool carrier 2, I have indicated diagrammatically in Fig. 1 by heavy broken lines, a set of arms and geometrical links connecting the circles that represent the identical orbital movements of the several parts.

In my improved embodiment, when the web cheek has been faced off in the manner above described, the tool commences to cut the raised high spots from the surface of the crank pin 12 and the usual bearing roller 22 takes position as shown in Fig. 2 to provide a backing for the pin 12 counter to the tool thrust. The pin turning operation in my arrangement is substantially the same as in the earlier machines, but in pin turning as in facing web cheeks, gudgeon pin 19 and bearing block 18 keep in close contact and so prevent any accident or circumstance from causing the cutting edge 5 of tool 4 from shifting even slightly away from its proper cutting position in relation to work piece 7.

Fig. 3 shows how the relative arrangement of the orbital tool carrier 2 and work carriages 9, the work carriages enable work piece 7 to be drawn back away from the tool 4 so the tool can be conveniently adjusted while the work piece can be loaded into the lathe, chucked, and unloaded as, for example, by a hoist in almost vertical direction.

That arrangement saves considerable hard manual labor that heretofore has been necessary in servicing lathes of this class because of a necessarily inconvenient arrangement of the work feed and the orbital tool carrier that was present in earlier machines equipped with forwardly projecting guide parts that prevented ready access to the tools so long as the crankshaft was in the lathe.

Having fully set forth and described my invention what I claim is:

1. In an orbital crankshaft lathe, means for supporting a work piece in said lathe, an orbitally moving tool carrier, cutting tools mounted thereon, means for supporting the forward end of the tool carrier independently of the work piece, and resilient means interposed between the supporting means and the tool carrier to permit limited, restrained, vertical movement of the tool carrier with relation to the supporting means for absorbing jars and tool thrust stresses, and means for imparting orbital movement to said tool carrier.

2. In a lathe, a work feed carriage for supporting a rotatable work piece, a master crankshaft, a tool carrier mounted thereon for orbital movement relative to the work piece, cutting tools mounted on said carrier, a main drive crankshaft, a connecting member suspended from the throws of the main drive crankshaft and pivotally connected to and supporting the front end of the tool carrier, means drivingly connecting said main drive shaft and the master shaft for imparting the same orbital movement to the front and rear ends of the tool carrier, and resilient means interposed between the supporting means and the carrier to permit limited, restrained, vertical movement of the tool carrier with relation to the supporting means for absorbing jars and tool thrust stresses.

3. In an orbital lathe of the class described, the combination of a supporting frame, a master crankshaft journaled thereon, a tool carrier mounted on the crankshaft and describing an orbital path of travel as the shaft is driven, cutting tools mounted on the front end of said tool carrier, means for supporting the forward end of the carrier and imparting parallel orbital movement identical with that imparted to the rear end of the carrier by the master crankshaft, a connecting member suspended from the throws of the tool carrier supporting means and including a slotted bearing in the lower end thereof, a gudgeon connected to the tool carrier and mounted on said bearing, resilient means interposed between the supporting frame and tool carrier and permitting upward restrained movement of the tool carrier with relation to the bearing for absorbing jars and tool thrust stresses, a transversely movable work feed carriage adjacent the front end of the carrier and supporting a rotatable work piece thereon, said carriage being automatically advanced to bring the work piece into engagement with the cutting tools as the lathe is operated.

4. In a lathe, a work feed carriage for supporting a rotatable work-piece, a master crankshaft, a tool carrier mounted thereon for orbital movement relative to the work-piece, cutting tools mounted on said carrier, a main drive crankshaft, a connecting member suspended from the throws of the main drive crankshaft and pivotally connected to and supporting the front end of the tool carrier, means drivingly connecting said main drive shaft and the master shaft for imparting the same orbital movement to the front and rear ends of the tool carrier, resilient means interposed between the connecting member and the tool carrier to permit limited, vertical movement of the tool carrier with relation to the connecting member, independently of the motion of the main drive crankshaft, for absorbing shocks and tool thrust stresses, and a roller provided on the tool carrier to form a backing for the work-piece counter to the tool thrust during the pin finishing operation.

5. In a lathe of the class described, the combination of a supporting frame having a master crankshaft journaled thereon, a tool carrier mounted on said crankshaft for orbital travel as the shaft is driven, cutting tools mounted on the front of the carrier, a main drive crankshaft journaled on said frame, a connecting rod with its upper end journaled on the throws of the main drive crankshaft, gudgeons on the carrier and seats in the lower ends of the rod and in which the gudgeons are mounted, and hardened bearing blocks interposed between said seats and gudgeons, resilient means interposed between the supporting frame and the tool carrier and permitting upward restrained movement of the tool carrier with relation to the bearing for absorbing jars and tool thrust stresses, means drivingly connecting said main drive shaft and master crankshaft for imparting identically similar orbital movement to the front and rear ends of the carrier, a transversely movable carriage adjacent the front end of the carrier and supporting a rotatable work-piece thereon, said carrier being automatically advanced and/or retracted to bring the work-piece into or out of cutting engagement with the cutting tools.

FREDERICK S. FLOETER.

REFERENCES CITED

The following references are of record in the file of this patent:

UNITED STATES PATENTS

| Number | Name | Date |
|---|---|---|
| 620,164 | Mumford | Feb. 28, 1899 |
| 2,310,691 | Groene | Feb. 9, 1943 |

FOREIGN PATENTS

| Number | Country | Date |
|---|---|---|
| 395,566 | Great Britain | July 20, 1933 |
| 687,577 | Germany | Feb. 1, 1940 |